Sept. 12, 1967 — G. N. CHARTIER — 3,340,720
AUTOMOBILE REPAIR TOOL
Filed Nov. 30, 1964 — 4 Sheets-Sheet 1

INVENTOR
GUY N. CHARTIER
BY
ATTORNEY

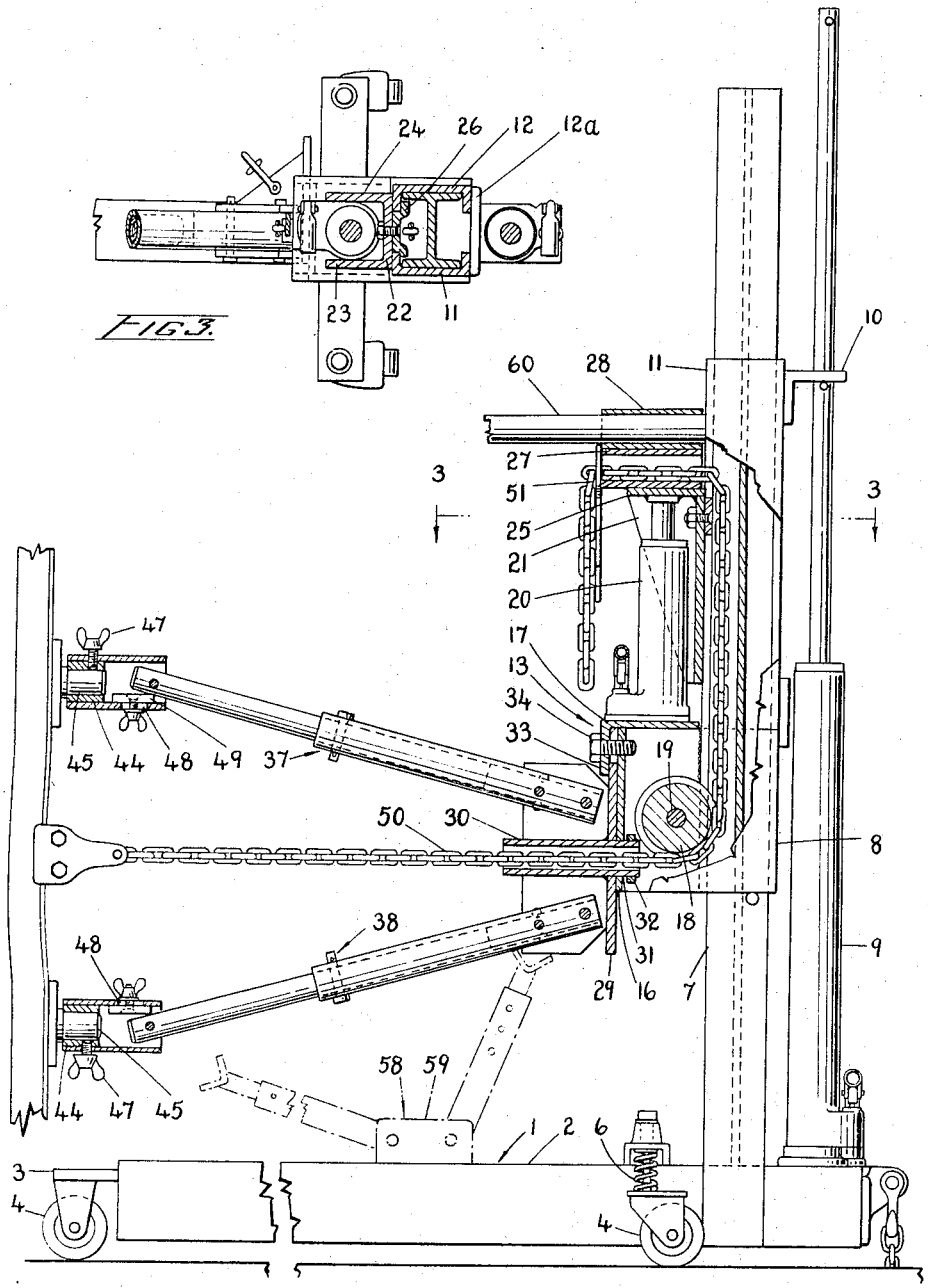

Sept. 12, 1967 G. N. CHARTIER 3,340,720
AUTOMOBILE REPAIR TOOL

Filed Nov. 30, 1964 4 Sheets-Sheet 3

INVENTOR
GUY N. CHARTIER
BY
ATTORNEY

Sept. 12, 1967    G. N. CHARTIER    3,340,720
AUTOMOBILE REPAIR TOOL
Filed Nov. 30, 1964    4 Sheets-Sheet 4

INVENTOR
GUY N. CHARTIER
BY
ATTORNEY

# United States Patent Office 3,340,720
Patented Sept. 12, 1967

3,340,720
AUTOMOBILE REPAIR TOOL
Guy Norman Chartier, West Hill, Ontario, Canada, assignor to Guy-Chart Tools Limited, Scarborough, Ontario, Canada
Filed Nov. 30, 1964, Ser. No. 414,744
13 Claims. (Cl. 72—389)

ABSTRACT OF THE DISCLOSURE

This invention relates to a tool or machine adapted for the repair of damaged metal structures and finds particular use in the repair of automobiles.

In brief the machine comprises an extensible base and a vertical post upon which a carriage reciprocates. Force applying means are mounted on the carriage and include force-holding means whereby a restoring force can be maintained while the associated power source is adjusted for an additional stroke. In addition, the invention discloses an anchoring system to preclude tilting or other undesirable movement of the machine during operation.

---

This invention relates in general to tools for the straightening and repair of metal structures and more specifically to the repair of automobile bodies, frames, panels, etc.

There are various machine and manual tools on the market at the present time for automobile repair work but none of those known to the applicant possess the versatility and power requirements necessary to cope with the many and varied problems arising in body shops.

The manual tools employed in this repair work are restricted because of power limitations while the powered machine tools known at present are bulky and unwieldy, making their use difficult, in the usually crowded and restricted repair bays. Further, most of the machine tools now in use are plagued by difficulties in set-up procedures and thus lead to higher costs which the public must bear.

Confronted with this problem, the applicant has invented a power or machine tool, simple and compact in structure but embodying great versatility and power wherein the space required for operation is at a minimum and set-up procedures are simplified thus maintaining costs at a more reasonable level.

The invention will be readily understood from the following detailed description and with reference to the appended drawings in which:

FIGURE 2 shows a side elevation with a cut-away section;

FIGURE 3 shows a sectional view taken along the line 3—3 of FIGURE 2.

Figure 1:
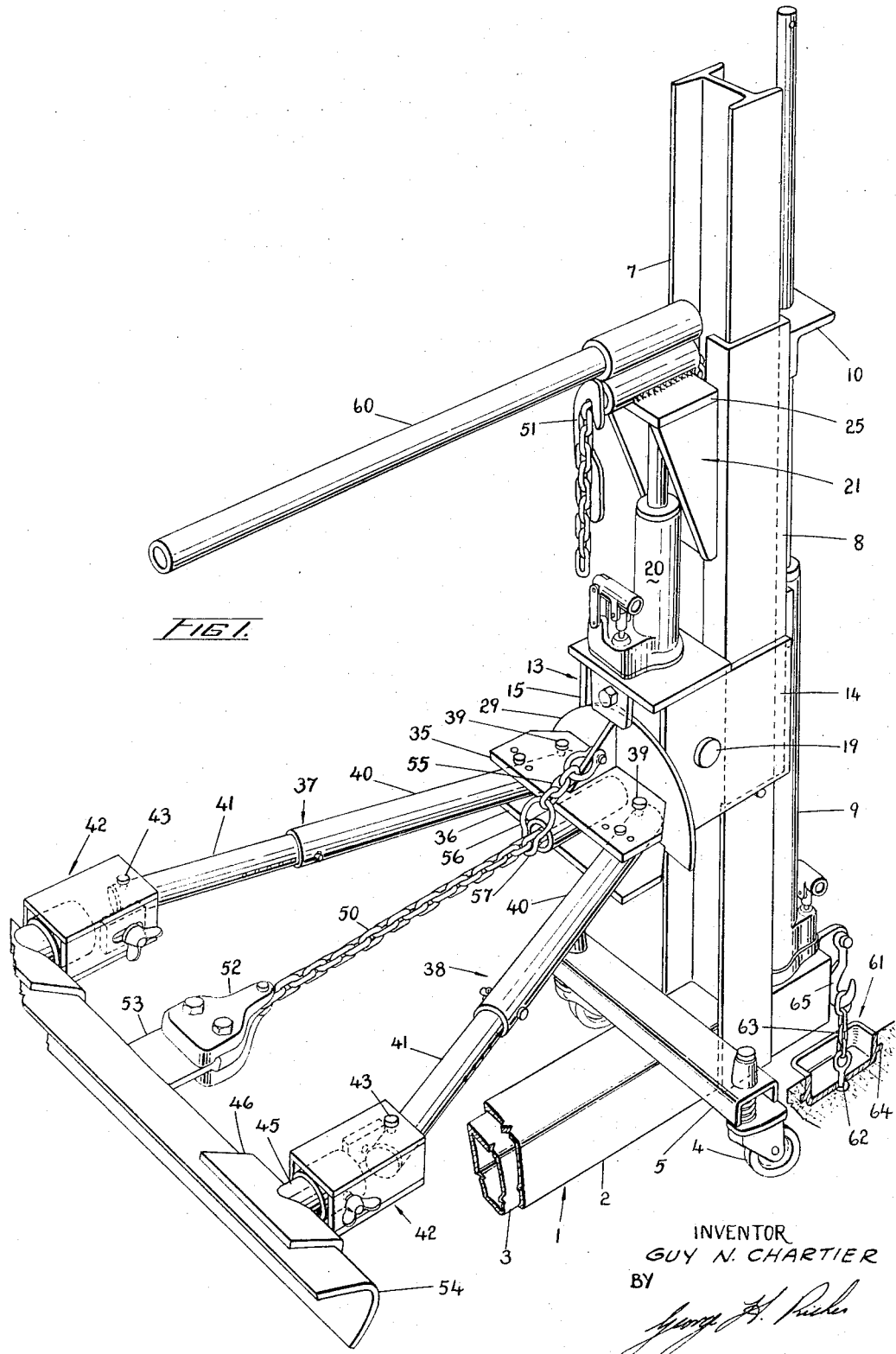
FIGURE 1 shows the machine tool in perspective set up to straighten a damaged automobile bumper.

With reference to FIGURES 1 and 2 of the drawings it is seen that the machine tool comprises a base structure 1 including a main base member 2 and a telescoping extension member 3 slidably mounted within the main section. Extension member 3 may be locked in any preferred extended position relative to main member 2 by any well known means such as a spring-urged locking pin or the like.

The base structure 1 is rendered mobile by mounting on casters 4, one caster on the outer end of the extension member 3 and two casters mounted on a caster mounting bar 5, secured as by welding or the like to the main base member 2. It will be noted that the casters on the bar are spring mounted so that upon applying forces to structures in some cases, the springs 6 are compressed and the base member seats on the ground thus giving more stability to the machine.

Mounted adjacent one end of the main base member 2 is a vertical column 7 comprising a standard I-beam section. At the bottom of this column, the web is cut away such that the flanges overly the main member. The column is secured to the main member 2 by any known means such as welding.

Slidably mounted on column 7 is a carriage 8 movable up and down the column by means of an adjusting jack 9 which may be of any known type, either manual or power driven. In the embodiment shown, a manually operated hydraulic jack is used. Linking the jack 9 to the carriage is a carriage adjusting bracket 10 welded or otherwise secured to the carriage 8.

It should be noted that brass inserts, or any other well known bearing expedient can be used to promote facility of sliding motion where applicable in this tool.

The carriage construction is very simple comprising two channel sections 11 and 12 which surround the flanges of the I-beam and are joined together at the rear by the adjusting bracket 10 and a plate 12a and at the front by a pulley housing structure 13.

There are, of course, numerous alternatives to the construction shown and it is not essential to the invention that the column comprise an I-beam section for a column or channel sections for the carriage.

The pulley housing 13 comprises two side plates 14 and 15 welded or otherwise secured to respective channel sections 11 and 12, a front plate 16 and a top plate 17. A pulley or sheave 18 is mounted for rotation on shaft 19 which is fixed at its respective ends to side plates 14 and 15.

Located on top of, and preferably bolted to the top plate 17 is a power means in the form of a power jack 20. Again, this jack may be of any suitable type and while a manually operated hydraulic jack is used in the embodiment shown, it is to be understood that a power driven remote control unit can be substituted whereby an operator may closely inspect the structure being repaired while simultaneously controlling the machine.

Power jack 20 is connected at the top end of the piston thereof to a slide block 21 comprising a back section 22, side gussets 23 and 24 and top section 25. The slide block 21 is slidably mounted on the carriage 8 by any suitable expedient. In the embodiment shown, a shouldered retaining plate 26 is bolted to the back section 22 such that the back section and the shoulders define grooves which receive opposing flanges of channel sections 11 and 12 as best seen in FIGURE 3.

Welded to the top section 25 of slide block 21 is a tubular element 27 which in turn carries a boom socket 28. The purpose of the element 27 and the socket 28 will be understood as the description proceeds.

Pivotally attached to the front of the pulley housing and more specifically to front plate 16 is a face plate 29. As best seen with reference to FIGURE 2, a guide tube 30 extends through the face plate and is welded thereto while the portion of the tube 30 projecting rearwardly of the face plate is journalled in a bore 31 in front plate 16 and retained by means of a collar 32 welded or shrunk onto the guide tube 30.

Welded to and depending from top plate 17 of the pulley housing 13 is a locking plate 33. This locking plate is provided to lock the face plate relative to the housing 13 in any preferred position and the locking function is achieved by passing bolt 34 through a clearance hole in the locking plate and into a threaded hole in the front plate 16. Thus, on threading the screw inwardly, the locking plate is deflected against the upper or outer rim of the face plate locking the same against the front plate of the pulley housing.

Integral with face plate 29 and extending perpendicularly therefrom in parallel spaced relation to each other are a pair of arm retaining plates 35 and 36 gusseted as shown in FIGURE 1 for greater rigidity. These retaining plates are spaced apart sufficiently to permit guide tube 30 to project therebetween and to receive the inner ends of arm assemblies 37 and 38, the latter assemblies being pivoted to the retaining plates by pivot pins 39. The upper retaining plate as seen in FIGURE 1 is provided with a series of indexing holes arranged concentrically with the pivots 39 and the arm assemblies can be locked in one of a plurality of different positions relative to the retaining plates by insertion of index pins passed through selected indexing holes into registering holes in the arm assemblies.

Each arm assembly comprises a main arm section 40 and an arm extension section 41 telescopically mounted in the main section and lockable therein at a selected one of a plurality of extended or retracted positions as by locking pins shown in FIGURES 1 and 2.

At the free end of the extension section an adjustable fixture holding assembly 42 is pivotally mounted as by pivot pins 43. Each fixture holding assembly comprises a generally open-ended box-like structure having interconnected side, top and bottom sections. One end of each assembly or housing carries a tubular sleeve member 44 for reception of the shanks 45 of fixtures 46. Suitable locking means such as thumbscrews 47 are provided to retain the fixtures.

As seen in FIGURES 1 and 2, the inner sides of each housing are slotted as at 48 for passage therethrough of bolts integrally attached to adjusting blocks 49. As best seen in FIGURE 2, these adjusting blocks abut the arm extension sections 41 controlling the angle of the fixture holding assemblies relative to the arm assemblies.

In order to transmit forces exerted on the slide block by power jack 20 to a selected point on a damaged structure, power transmitting means embodied by a link chain or cable 50 is passed through guide tube 30, around sheave 18, and thence upwardly and out of tubular element 27. The chain is releasably locked at the end of element 27 by means of a grab hook 51. This hook is so shaped as to receive a chain link edgewise but is too narrow at the mouth to allow passage of an adjacent link lying in a plane at right angles to the hooked link, thus the grab hook may be said to provide abutment means between the chain and the end of the tubular element. On the other end of chain 50 is mounted any suitable gripping device, the choice of which depends upon the particular task at hand. In the embodiment shown in FIGURE 1 a vice-like unit 52 is shown bolted to the chain for gripping a metal tab 53 welded to car bumper 54 at the point where the operator requires to exert a restoring force. Normally such an expedient is not used on a car bumper but for illustrative purposes, this appeared to furnish the clarity required in disclosing the principle of operation.

The operation of this machine is very simple. After deciding upon the point of application of the restoring force, the operator selects suitable fixtures 46 and locks them in place in the fixture holding assemblies. The bracing means, that is, the arm assemblies, are placed in abutting relationship with the structure astride the selected point and the power transmitting means is attached to that point. The slide block is then lowered as far as the power jack will permit and the carriage adjusted vertically to ensure a straight pull.

Following this procedure, the chain is pulled taut through the tubular element 27 and locked by means of the grab hook as hereinbefore described. By actuating the jack, slide block 21 is forced upwardly and since the chain is locked to the slide block, a force is transmitted to the damaged structure.

At the end of the jack stroke, it may be realized that further displacement is required. Provision has been made to maintain the restoring force while re-adjusting chain 50 relative to tubular element 27. As most clearly shown in FIGURE 1 a short chain 55 is pivotally attached to one of the arm retaining plates through a gusset this chain 55 carrying at its free end a metal ring 56. This ring is constricted at one portion of its periphery to form a narrow channel 57. Channel 57 functions in a manner similar to the grab hook 51, that is, a link may be inserted edgewise but an adjacent link lying in a plane at right-angles to the first-mentioned link cannot pass through, thus, on lifting ring 56 and more specifically channel 57 into engagement with chain 50, the power jack and thus slide block 21 may be lowered, releasing the tension on chain 50 as far as the ring. Thus the restoring force is maintained on the structure until the upper part of chain 50 has again been pulled taut and locked by the grab hook preparatory to a further stroke of the jack and slideblock.

The arm assemblies represent only one bracing means on applicant's machine and it should be noted that the telescopic base member is also useful in this respect. For example, when straightening an automobile frame, the base can be positioned thereunder and clamping means, mounted on the end of the extension member 3 connected to the frame. Thus, the frame is braced for application of restoring forces through chain 50.

When utilizing the base as bracing means it is sometimes advisable, especially when exerting substantial force, to employ auxiliary bracing means 58, shown in phantom in FIGURE 2, to brace the pulley housing and therefore the column structure 7 in order to minimize the stresses set up at the junction of the column and the main base member. It is possible to use one of the arm assemblies for this purpose pivotally mounted as shown in FIGURE 2 to two brackets 59. Of course, arms intended for this specific purpose alone may be provided.

It is also possible to use one of these auxiliary arms as a structure brace.

A further illustration of the versatility of this machine is seen with reference to its ability to reduce roof panel depressions. FIGURES 1 and 2 show a boom 60 engaged in boom socket 28. By suspending one or more suction cups or the like from this boom and attaching same to a damaged roof, all that is necessary to reduce the depressions is to raise the power jack.

In some instances where a frame is to be straightened or where substantial forces are to be applied it is wise to anchor the machine tool in order to avoid any possibility of some unforeseen and violent reaction which might conceivably result in uncontrolled and dangerous movement of the machine tool.

In this respect, applicant has conceived of the expedient whereby a series or array of anchor pots 61 situated in spaced relation around the perimeter of a repair bay.

The anchor pots comprise a cast or fabricated tubular body, closed at the bottom and tapering inwardly to the rim. In the bottom of the pot is mounted an eye-bolt 62 or the like, this bolt retaining a length of chain 63.

The anchor pots are imbedded in the concrete floor of the bay so that the rim is flush with the floor level and an additional flange 64 may be cast or otherwise provided around the pot body to more securely anchor the pot in the concrete.

These anchor pots are used in conjunction with a hook 65 pivotally attached to the rear of the base member adjacent the column 7.

When not in use, the anchor pots are closed with a flush fitting cover.

From the foregoing it is seen that the applicant has invented a machine of great versatility, simple in use and compact in structure. The "centre-pull" feature of this machine concentrates forces applied to the damaged area alone leaving surrounding areas undamaged. Extra jacks and bent-extensions usually required in prior art machines are eliminated. The machine may even be used as a hoist.

Power requirements vary for different applications but in the embodiment shown the power jack has a capacity of 16,000 lbs. while the adjusting jack, which may be used as a complementary force exerting means has a capacity of 6,000 lbs. These jacks may be substituted of course depending on specific requirements.

A second embodiment of the repair tool illustrated in FIGURES 4 to 6 inclusive will now be described.

Figure 4:
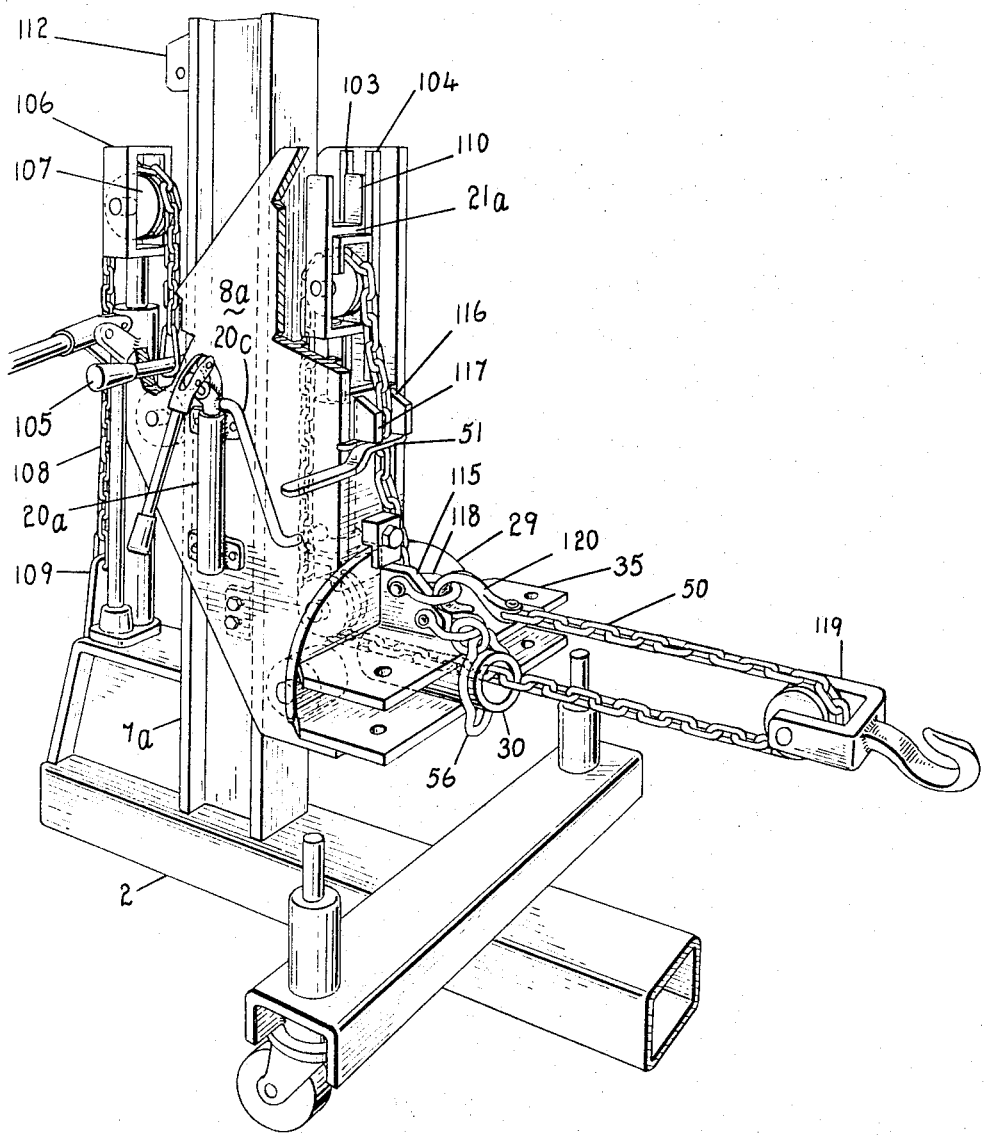
FIGURE 4 shows, in perspective, an alternate embodiment of the machine tool with the arm assemblies removed for clarity.
Figure 5:
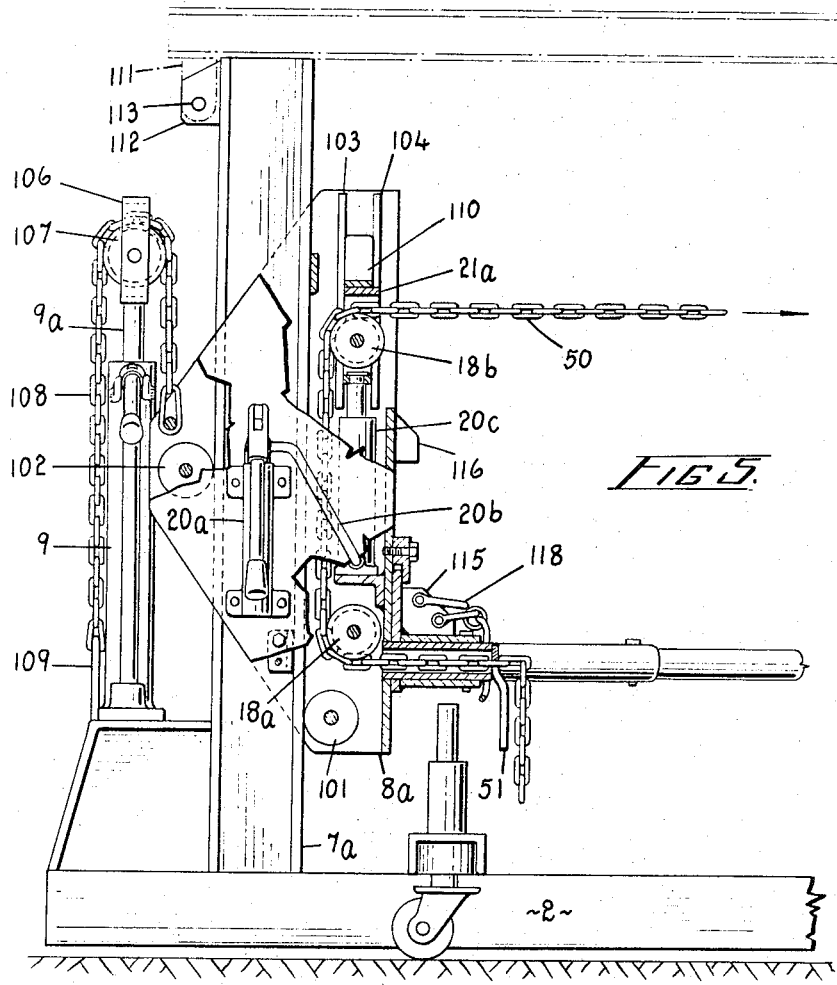
FIGURE 5 is a side elevation of the alternate embodiment partially cut-away to show the chain roller.
Figure 6:
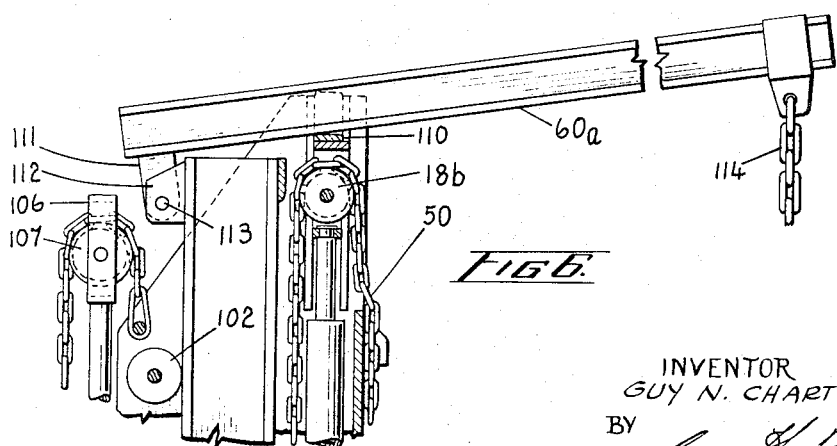
FIGURE 6 is a partial side elevation of the alternate embodiment showing the lifting boom.

With particular reference to FIGURES 4 and 5, it will be seen that basically, the structure of this second embodiment is substantially the same as the foregoing. However, it will be noted that the modified movable carriage 8a includes rollers 101 and 102 to facilitate movement thereof on and relative to the vertical column 7a. Further, the carriage 8a includes spaced, integral guide rails 103 and 104 adapted to guide slide block 21a in its travel relative to carriage 8a.

Carriage 8a is further provided with a handle means 105 extending through and outwardly of each side of the carriage 8a.

In this second embodiment, the power jack pump, designated 20a, is suitably connected to the side of carriage 8a and connects to the power jack piston or ram and cylinder designated 20b, by means of a pressure fluid conduit 20c. A remote ram-actuating system could, of course, be used if desired.

As best seen in FIGURE 5, adjusting jack 9, and more specifically, the ram 9a thereof, carries at its upper end a pulley-wheel housing 106 in which housing is rotatably mounted a pulley-wheel 107. A chain or other suitable cable means 108, is connected to a bracket 109 mounted on the main frame; this chain 108 passing upwardly from said bracket, over the pulley-wheel 107 and downwardly for connection to the handle means 105. There is thus provided a smooth and efficient adjusting means operable to selectively position the carriage 8a in a desired location on and relative to the vertical column 7a.

With particular reference to the slide block structure 21a, it will be noted that the latter differs from its counterpart in the first described embodiment in that a pulley-wheel 18b is rotatably mounted therein. Further, the slide block 21a terminates at its upper end in an upwardly opening U-shaped portion 110, the purpose of which will be set forth hereinbelow.

A further difference between the first and second embodiments resides in the structure of the lift boom designated 60 in the first embodiment and 60a in the second. As best seen in FIGURE 6, boom 60a comprises an I-beam having secured at one end thereof a depending bracket portion 111. This depending bracket portion is pivotally mounted between spaced lugs 112 secured to the upper rear surface of the vertical column 7a by means of a pivot pin 113. When in an inoperative position, the boom 60a rests on the upper end of vertical column 7a, however, in the event that an operator wishes to apply a lifting force through chain 114 (see FIGURE 6), carriage 8a is moved upwardly to a desired starting position and then the power jack ram is actuated to force slide block 21a upwardly in guide rails 103 and 104 whereby the U-shaped portion 110 cradles the boom 60a and then pivots the latter about pivot pin 113.

Additional features connected to the carriage 8a and the gusset 115 interconnecting face-plate 29 and arm retaining plate 35, are the abutment lugs 116, 117 and clevis 118 respectively. These additional features are operable to permit various different connections of power transmitting chain 50 and thus provide for different load capacities and speed of pulling action as will now be described.

As shown in FIGURE 1, the upper end of chain 50 is locked to the slide block by means of grab hook 51. With the chain 50 in this operative condition, pull P may be applied to a damaged structure with a certain chain speed S.

Turning to FIGURE 4 and neglecting the hook and pulley combination designated by the numeral 119, that is, considering a straight pull as in FIGURE 1, the upper end of chain 50 is locked by application of grab hook 51 in abutting relationship with abutment lugs 116, 117. With this arrangement, a pull of P/2 is applied to a damaged structure with a chain speed of 2S.

Considering a still further arrangement whereby chain 50, at the lower end thereof is, as shown in FIGURE 4, looped around the hook and pulley combination 119, the end hook 120 being connected to clevis 118 and where the upper end of chain 50 is locked to the sliding block 21a, a pull of 2P is obtained while the chain speed is decreased to S/2.

Further, by locking chain 50 against the outer end of guide tube 30 as shown in FIGURE 5, a pulling force may be applied to a point substantially on a level with the top of the repair tool, that is, the tool is capable of applying horizontal restoring forces to points lying in a considerable height range.

It will be appreciated that the repair tool set forth herein is extremely versatile and can be employed in a variety of applications. It will also be appreciated that, to those skilled in this art, many further changes and modifications will become apparent without departing from the spirit and scope of the invention herein disclosed.

What I claim as new and desire to protect by Letters Patent of the United States is:

1. In a machine tool for the straightening and repair of metal structures, the combination of, a base; a column vertically mounted on said base; carriage means movably mounted and selectively positionable on said column; power means mounted on said carriage; power transmitting means to said machine tool to maintain an applied and operatively connectable to the metal structure; first locking means for detachably securing said power transmitting means to said power means and second locking means for releasably locking said power transmititng means to said machine tool to maintain an applied force when the power transmitting means is temporarily disconnected from said power means; adjustable brace means mounted on the tool adapted to stabilize and anchor the structure against bodily movement in the direction of the forces applied by the power means through the power transmitting means whereby the damaged structure is restored substantially to its original shape.

2. In a machine tool for the straightening and repair of metal structures, the combination of, a base; a column vertically mounted on said base; carriage means movably mounted and selectively positionable on said column; power means mounted on said carriage; power transmitting means operatively actuated by said power means and operatively connectable to the metal structure; said power means including a hydraulic jack fixed to said carriage and adapted to impart reciprocal sliding motion to a slide block slidably mounted on said carriage above said jack; said power transmitting means comprising a chain detachably connected at one end to said power means and thence passing round pulley means housed in said carriage for connection to a structure under repair; adjustable brace means mounted on the tool adapted to stabilize and anchor the structure against bodily movement in the direction of the forces applied by the power means through the power transmitting means whereby the damaged structure is restored substantially to its original shape.

3. In a machine tool for the straightening and repair of metal structures, the combination of, a base; a column vertically mounted on said base; carriage means movably mounted and selectively positionable on said column; power means mounted on said carriage; power transmitting means operatively actuated by said power means and operatively connectable to the metal structure; adjustable brace means mounted on the tool adapted to stabilize and anchor the structure against bodily movement in the direction of the forces applied by the power means through the power transmitting means whereby the damaged structure is restored substantially to its original shape; said machine tool being in combination with an array of anchor pots situated in spaced relationship around a repair bay, said pots each comprising a tubular body tapering outwardly to a closed bottom end, a flange extending around said body and chain retaining means fixed centrally of said bottom, said pots being imbedded in and flush with the floor of the bay; a hook mounted on the base of the tool adjacent the column so that the tool can be anchored in a preferred location in the bay.

4. In a machine tool for the straightening and repair of metal structures, the combination of, a base; a column vertically mounted on said base; carriage means movably mounted and selectively positionable on said column, said carriage means including first roller means rotatably mounted in a lower front portion thereof, said first roller means operable to engage the rear of the vertical column and said second roller means operable to engage the front of the vertical column; power means mounted on said carriage; power transmitting means operatively actuated by said power means and operatively connectable to the metal structure; adjustable brace means mounted on the tool adapted to stabilize and anchor the structure against bodily movement in the direction of the forces applied by the power means through the power transmitting means whereby the damaged structure is restored substantially to its original shape.

5. The combination, in a machine tool, as defined in claim 2 wherein the chain is passed through a relatively short tubular element fixedly mounted on said slide block, said chain being releasably connected thereto by a grab hook adapted to receive one chain link and provide an abutment means between a link adjacent to said one link and an end of said tubular element, releasably locking said chain to said slide block.

6. In a machine tool for the repair of metal structures the combination of, an elongated mobile base having a telescopically mounted selectively positionable extension member therein at one end; a column vertically mounted on said base adjacent the other end thereof; carriage means slidably mounted and selectively positionable by powered adjusting means mounted on the base; power means fixedly mounted on said carriage operative to impart reciprocal movement to a slide block slidably mounted for a fixed stroke on said carriage immediately above said power means; power transmitting means in the form of a chain, said transmitting means extending downwardly from said block around pulley means housed in said carriage and outwardly through a carriage-mounted guide tube for attachment to a damaged structure; brace means on said tool for co-operation with said power transmitting means including a face plate rotatably mounted about the axis of said guide tube, and a pair of arm assemblies pivotally mounted on said faceplate astride the axis of said guide tube so that during application of forces to a selected point on a damaged structure through the chain, the structure is braced and stabilized by the positioning of the arm assemblies astride the selected point and in abutting relationship with said structure.

7. The combination, in a machine tool, as defined in claim 6 wherein the arm assemblies each comprise, a main arm section pivotally mounted between arm retaining plates integral with said face plate and extending perpendicularly therefrom in parallel spaced relationship to each other, said plates being provided with a series of arm indexing holes arranged concentrically around a pivot mounting the main arm section to the plates; an index locking pin adapted to pass through a selected indexing hole and into a registering hole in the main arm section to thereby lock the arm at a selected angle relative to the face plate; an arm extension section telescopically mounted in the main section and lockable therein at a selected one of a plurality of extended positions, said extension carrying at the end remote from the main section an adjustable fixture holding assembly.

8. The combination, in a machine tool, as defined in claim 7 wherein said guide tube is fixedly mounted between said arm retaining plates intermediate said main arm section; chain locking means pivotally secured to one of said retaining plates adjacent the guide tube for selectively locking said chain so that at the end of a slide block stroke, said chain locking means locks the chain and maintains an applied force while the slide block is re-positioned for a further stroke and the upper part of the chain is adjusted relative to said block.

9. The combination, in a machine tool, as defined in claim 8 wherein said chain locking means includes a metal ring constricted at one portion of its periphery to form a narrow channel, said channel being of such a width as to accept one link of said chain edge-wise but too narrow to accept an adjacent link lying in a plane perpendicular to said one link.

10. The combination, in a machine tool, as defined in claim 7 wherein said adjustable fixture holding assembly comprises an open-ended box-like housing; pivot means pivotally mounting said housing at one end thereof to the arm extension section; a tubular sleeve fixedly mounted in the other end of said housing adapted to receive and lock suitable holding fixtures; an elongated slot in one side of said housing, and an adjusting block slidably mounted within said housing and having a screw projecting through said slot; a wing-nut co-operating with said screw such that the adjusting block can be positioned within said housing for abutment with the end of said arm extension section to govern the angle of the housing and the fixtures relative to the arm extension section.

11. The combination as defined in claim 2 and further including a lifting boom pivotally mounted at one end thereof on the upper end of the vertical column; means formed on the upper end of said slide block to selectively engage and pivot the lifting boom upon vertical sliding motion of said slide block.

12. The combination as defined in claim 2 and further including second pulley means rotatably mounted in said slide block, said power transmitting means being entrained around said second pulley means and passing downwardly therefrom around the pulley means housed in said carriage, and releasable locking means operable to selectively lock said power transmitting means relative to the carriage adjacent the second pulley means.

13. The combination of claim 6 wherein said powered adjusting means comprises a hydraulic jack secured to the base; a pulley rotatably mounted on the upper ram-end of the jack and cable means entrained over said pulley and connected at one end to the base and connected at the other end to said carriage.

References Cited

UNITED STATES PATENTS

| | | | |
|---|---|---|---|
| 2,443,931 | 6/1948 | Stultz | 72—386 |
| 2,863,489 | 12/1958 | Priest | 72—390 |
| 3,050,099 | 8/1962 | Smith | 72—705 |
| 3,088,513 | 5/1963 | Marquardt | 72—705 |

CHARLES W. LANHAM, *Primary Examiner.*

L. A. LARSON, *Assistant Examiner.*